United States Patent
Naota et al.

(10) Patent No.: US 9,692,933 B2
(45) Date of Patent: Jun. 27, 2017

(54) IMAGE FORMING APPARATUS THAT ENSURES EXECUTION OF ASYNCHRONOUS INFORMATION SHARING WITHOUT USING MAIL SERVER, IMAGE FORMING METHOD AND RECORDING MEDIUM

(71) Applicant: KYOCERA Document Solutions Inc., Osaka (JP)

(72) Inventors: Tomonori Naota, Osaka (JP); Ryusuke Nakatani, Osaka (JP); Masato Hirota, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/153,284

(22) Filed: May 12, 2016

(65) Prior Publication Data

US 2016/0381245 A1 Dec. 29, 2016

(30) Foreign Application Priority Data

Jun. 25, 2015 (JP) ................................. 2015-127243

(51) Int. Cl.
*H04N 1/32* (2006.01)
*H04N 1/00* (2006.01)
*G06F 3/12* (2006.01)

(52) U.S. Cl.
CPC ....... *H04N 1/32502* (2013.01); *G06F 3/1253* (2013.01); *G06F 3/1291* (2013.01);
(Continued)

(58) Field of Classification Search
CPC ...... G06F 3/126; G06F 3/1285; G06F 3/1253; G06F 3/1291; G06F 3/1293;
(Continued)

(56) References Cited

U.S. PATENT DOCUMENTS

2004/0179222 A1\* 9/2004 Sato ................... G06K 15/1859
358/1.13
2005/0086273 A1 4/2005 Loebbert et al. ............. 707/204
(Continued)

FOREIGN PATENT DOCUMENTS

JP 2005-31982 A 2/2005
JP 2012-4709 A 1/2012

OTHER PUBLICATIONS

Extended European search report dated Nov. 17, 2016, issued by the European Patent Office in corresponding application EP 16171761.6.

*Primary Examiner* — Allen H Nguyen
(74) *Attorney, Agent, or Firm* — Stein IP, LLC

(57) ABSTRACT

An image forming apparatus that executes information sharing among a plurality of image forming apparatuses includes a communication circuit, a set value management circuit, a storage circuit, and a distribution hold list management circuit. The communication circuit ensures communication with another image forming apparatus of the plurality of the image forming apparatuses. The set value management circuit distributes, based on a master authority as an authority for distributing a changed set value to the other image forming apparatus, the changed set value to the other image forming apparatus. The storage circuit, when the distribution fails, stores a distribution hold list that includes a combination of: an identifier of another image forming apparatus where the distribution has failed, and an item name and value of a set value where the distribution has failed. The distribution hold list management circuit manages the stored distribution hold list.

8 Claims, 12 Drawing Sheets

| Name of Distribution-Held Slave Apparatus | Distribution-Held Set Value Content | |
|---|---|---|
| Image Forming Apparatus 20B | Setting Item X = A4 | ex1 |
| Image Forming Apparatus 20B | Setting Item Y = 100 | ex2 |
| | | |

(52) U.S. Cl.
CPC ....... *G06F 3/1293* (2013.01); *H04N 1/00347* (2013.01); *H04N 1/00384* (2013.01); *H04N 1/00411* (2013.01); *H04N 1/00973* (2013.01); *H04N 1/32545* (2013.01); *H04N 1/32625* (2013.01); *H04N 1/32694* (2013.01); *H04N 2201/0031* (2013.01); *H04N 2201/0032* (2013.01); *H04N 2201/0036* (2013.01); *H04N 2201/0039* (2013.01); *H04N 2201/0043* (2013.01); *H04N 2201/0072* (2013.01); *H04N 2201/0081* (2013.01); *H04N 2201/0082* (2013.01); *H04N 2201/0091* (2013.01); *H04N 2201/0094* (2013.01); *H04N 2201/3219* (2013.01)

(58) Field of Classification Search
CPC ........... H04N 1/32502; H04N 1/00347; H04N 1/00973; H04N 1/32625; H04N 1/32694; H04N 1/00384; H04N 1/00411; H04N 1/32545; H04N 2201/0032; H04N 2201/0036; H04N 2201/0039; H04N 2201/0043; H04N 2201/0072; H04N 2201/0094; H04N 2201/0091; H04N 2201/3219; H04N 2201/0082; H04N 2201/0081

USPC ..................................................... 358/1.15
See application file for complete search history.

(56) References Cited

U.S. PATENT DOCUMENTS

| | | | |
|---|---|---|---|
| 2005/0262216 A1 | 11/2005 | Kashiwabara et al. | 709/208 |
| 2006/0061817 A1* | 3/2006 | Kakigi | G06F 3/1205 358/1.15 |
| 2007/0109584 A1 | 5/2007 | Motohashi et al. | 358/1.13 |
| 2008/0005331 A1 | 1/2008 | Shiraishi | 709/226 |
| 2010/0241695 A1 | 9/2010 | Sagara | 709/203 |
| 2011/0242565 A1* | 10/2011 | Armstrong | G06F 3/121 358/1.13 |
| 2013/0046843 A1 | 2/2013 | Sagara | 709/208 |
| 2013/0271786 A1* | 10/2013 | Yokoyama | H04N 1/00233 358/1.15 |
| 2014/0355022 A1* | 12/2014 | Oda | H04N 1/00214 358/1.13 |
| 2016/0291904 A1* | 10/2016 | Fukushima | G06F 3/1285 |

* cited by examiner

FIG. 2

| Name of Distribution-Held Slave Apparatus | Distribution-Held Set Value Content |
|---|---|
| Image Forming Apparatus 20B | Setting Item X = A4 — ex1 |
| Image Forming Apparatus 20B | Setting Item Y = 100 — ex2 |

30b

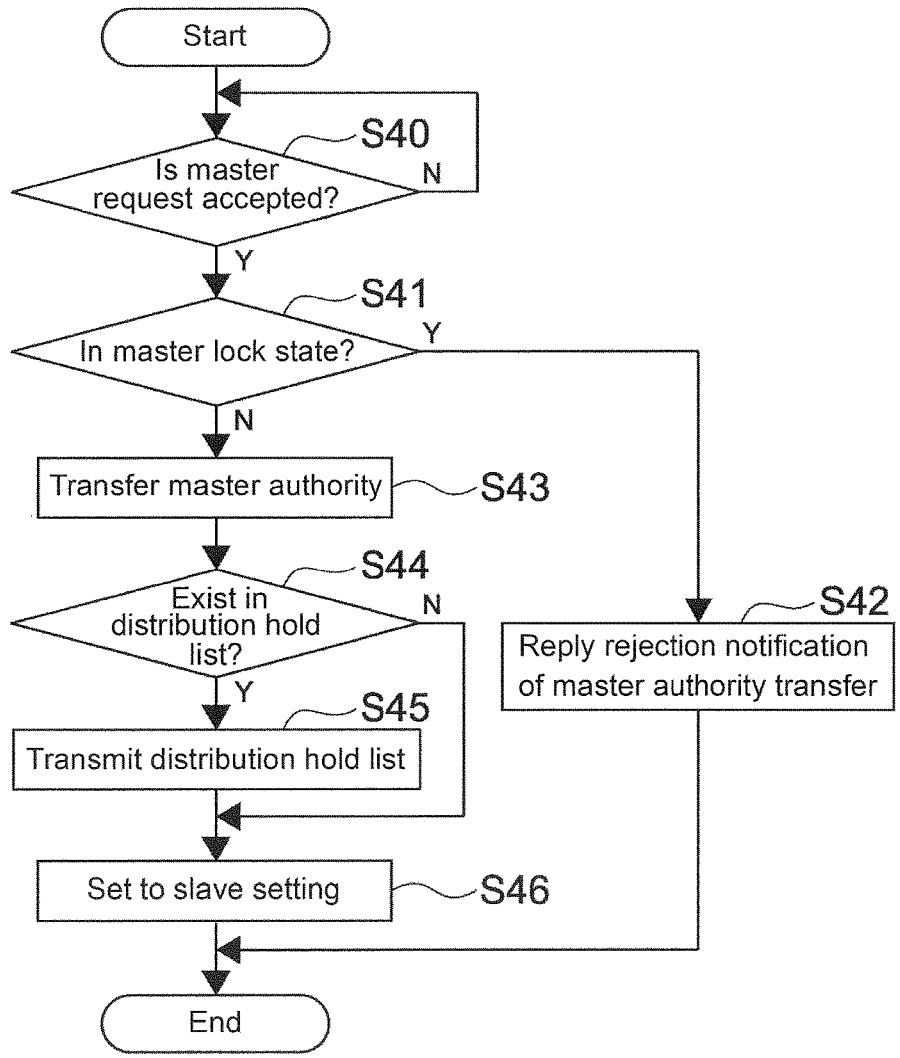

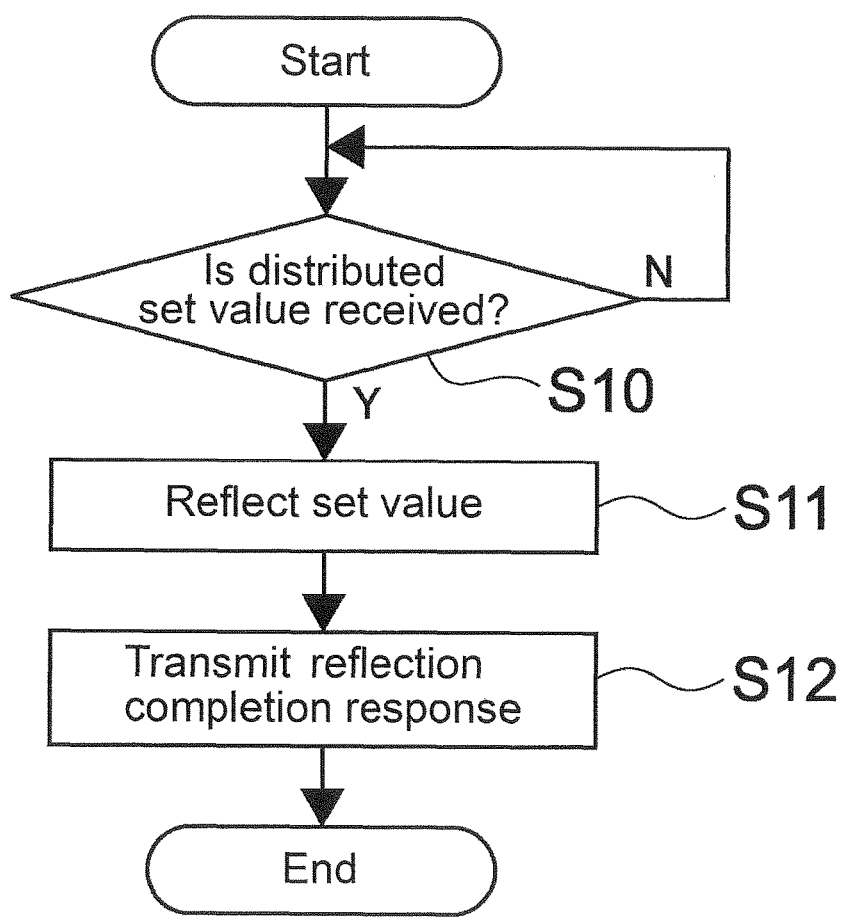

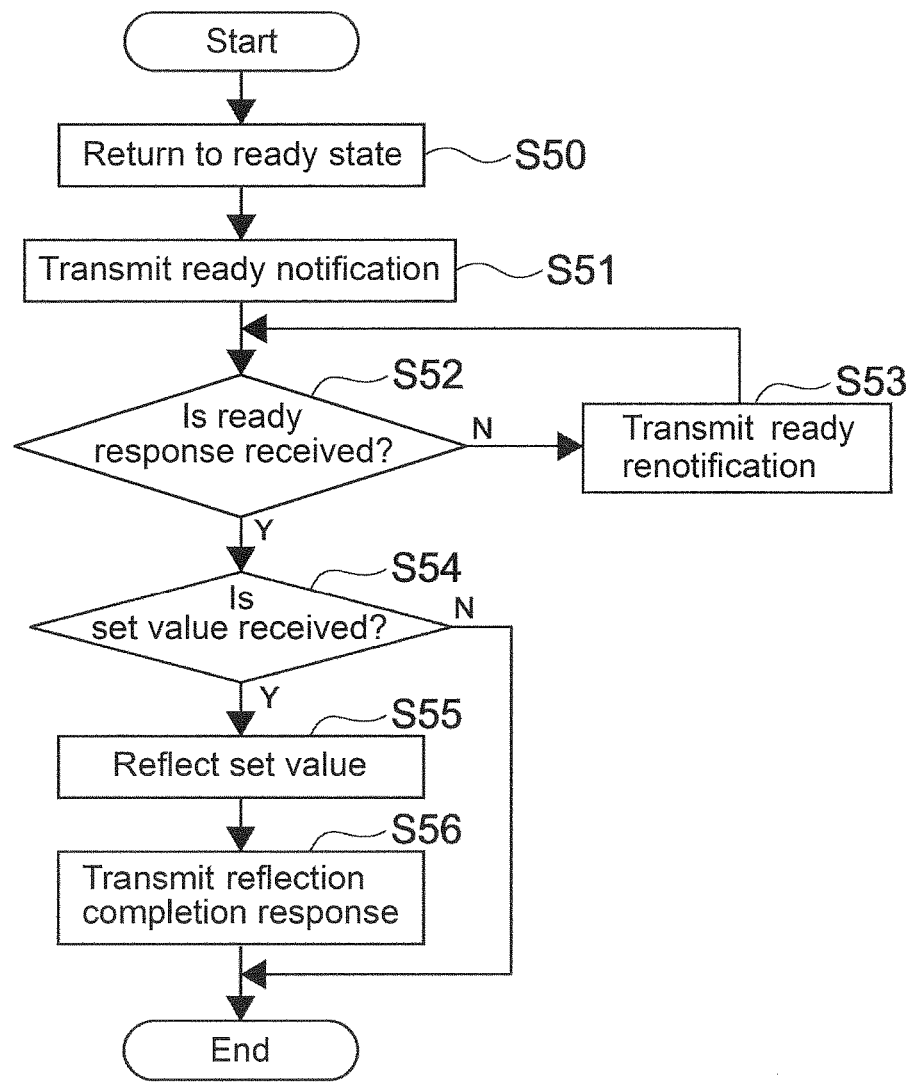

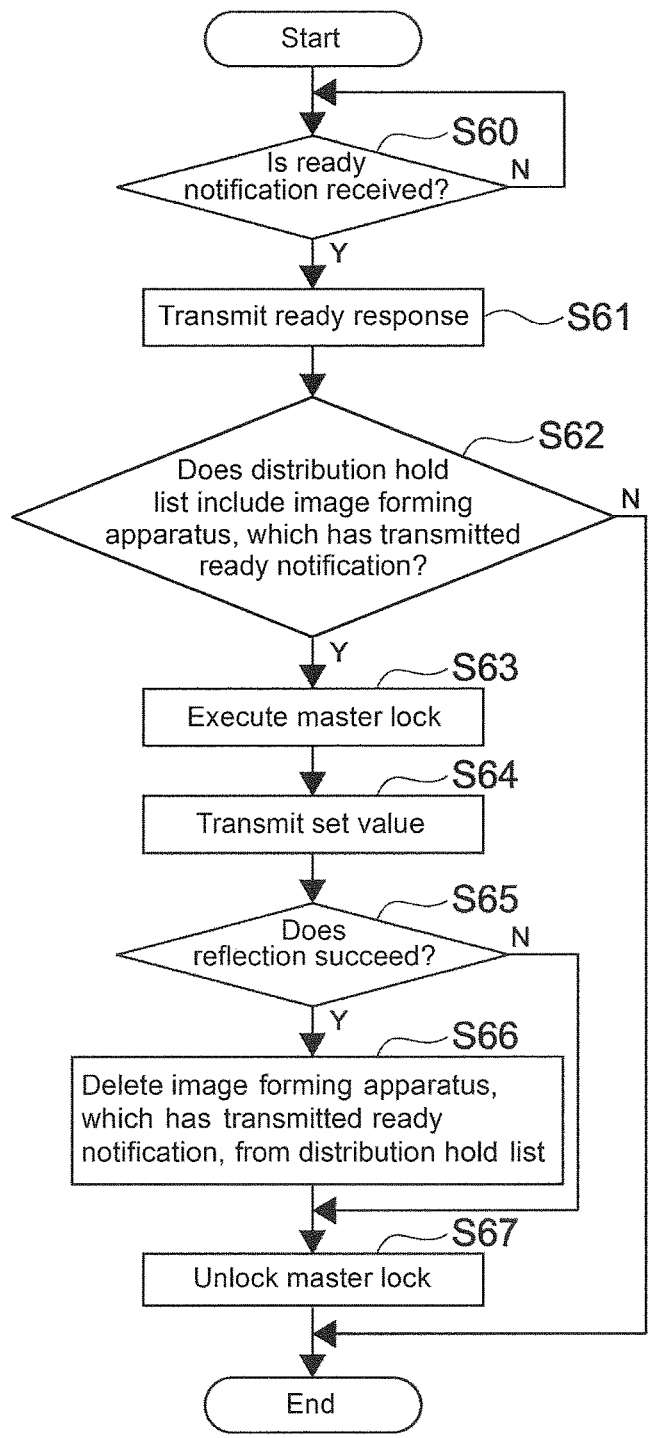

IMAGE FORMING APPARATUS THAT ENSURES EXECUTION OF ASYNCHRONOUS INFORMATION SHARING WITHOUT USING MAIL SERVER, IMAGE FORMING METHOD AND RECORDING MEDIUM

INCORPORATION BY REFERENCE

This application is based upon, and claims the benefit of priority from, corresponding Japanese Patent Application No. 2015-127243 filed in the Japan Patent Office on Jun. 25, 2015, the entire contents of which are incorporated herein by reference.

BACKGROUND

Unless otherwise indicated herein, the description in this section is not prior art to the claims in this application and is not admitted to be prior art by inclusion in this section.

There has been variously contrived information sharing between a plurality of typical image forming apparatuses in a network to which the plurality of the typical image forming apparatuses (Multifunction Peripheral (MFP)) are connected.

For example, there is proposed a technique where a plurality of image processing apparatuses connected to a network are separated into an image processing apparatus assumed as a master and an image processing apparatus assumed as a slave, and executes mutual communication. This technique ensures information sharing among the plurality of image processing apparatuses without using a server that controls the information sharing.

For example, for information sharing among a plurality of information holding devices connected to a network, when a part of the devices is turned off, there is proposed a technique that achieves asynchronous information sharing by transmitting an e-mail to the turned-off device.

SUMMARY

An image forming apparatus that executes information sharing among a plurality of image forming apparatuses according to one aspect of the disclosure includes a communication circuit, a set value management circuit, a storage circuit, and a distribution hold list management circuit. The communication circuit ensures communication with another image forming apparatus of the plurality of the image forming apparatuses. The set value management circuit distributes, based on a master authority as an authority for distributing a changed set value to the other image forming apparatus, the changed set value to the other image forming apparatus. The storage circuit, when the distribution fails, stores a distribution hold list that includes a combination of: an identifier of another image forming apparatus where the distribution has failed, and an item name and value of a set value where the distribution has failed. The distribution hold list management circuit manages the stored distribution hold list.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 2 illustrates a concrete example of the distribution hold list according to the one embodiment;

FIG. 9 illustrates a process of the image forming apparatus that transitions from the master to the slave due to a change of a set value and a master request;

FIG. 10 illustrates a process of the slave to which the image forming apparatus, which has become the master due to the change of a set value, distributes the set value;

FIG. 11 illustrates a process of the slave that has returned to the ready state and receives the set value for which a distribution is held; and FIG. 12 illustrates a process of the master that distributes the set value, for which the distribution is held, to the slave that has returned to the ready state.

DETAILED DESCRIPTION

Figure 1:
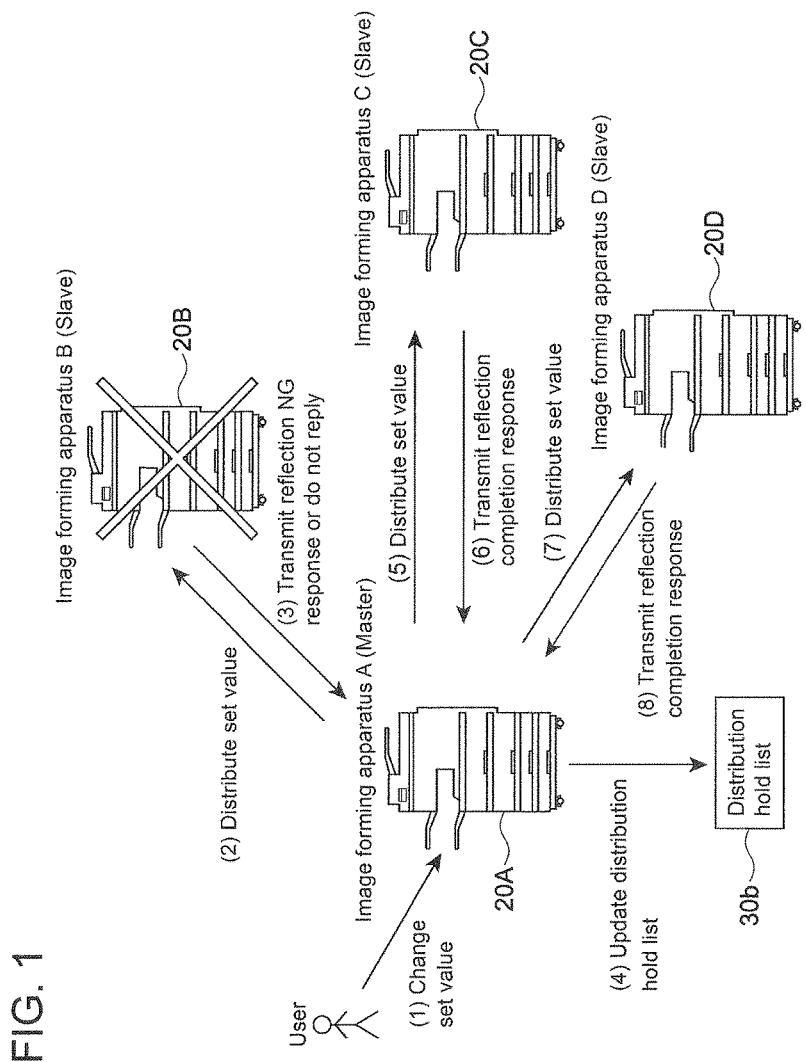
FIG. 1 illustrates an outline of creating or updating a distribution hold list by a plurality of image forming apparatuses according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes embodiments of the disclosure with reference to the drawings.

Outline

Figure 3:
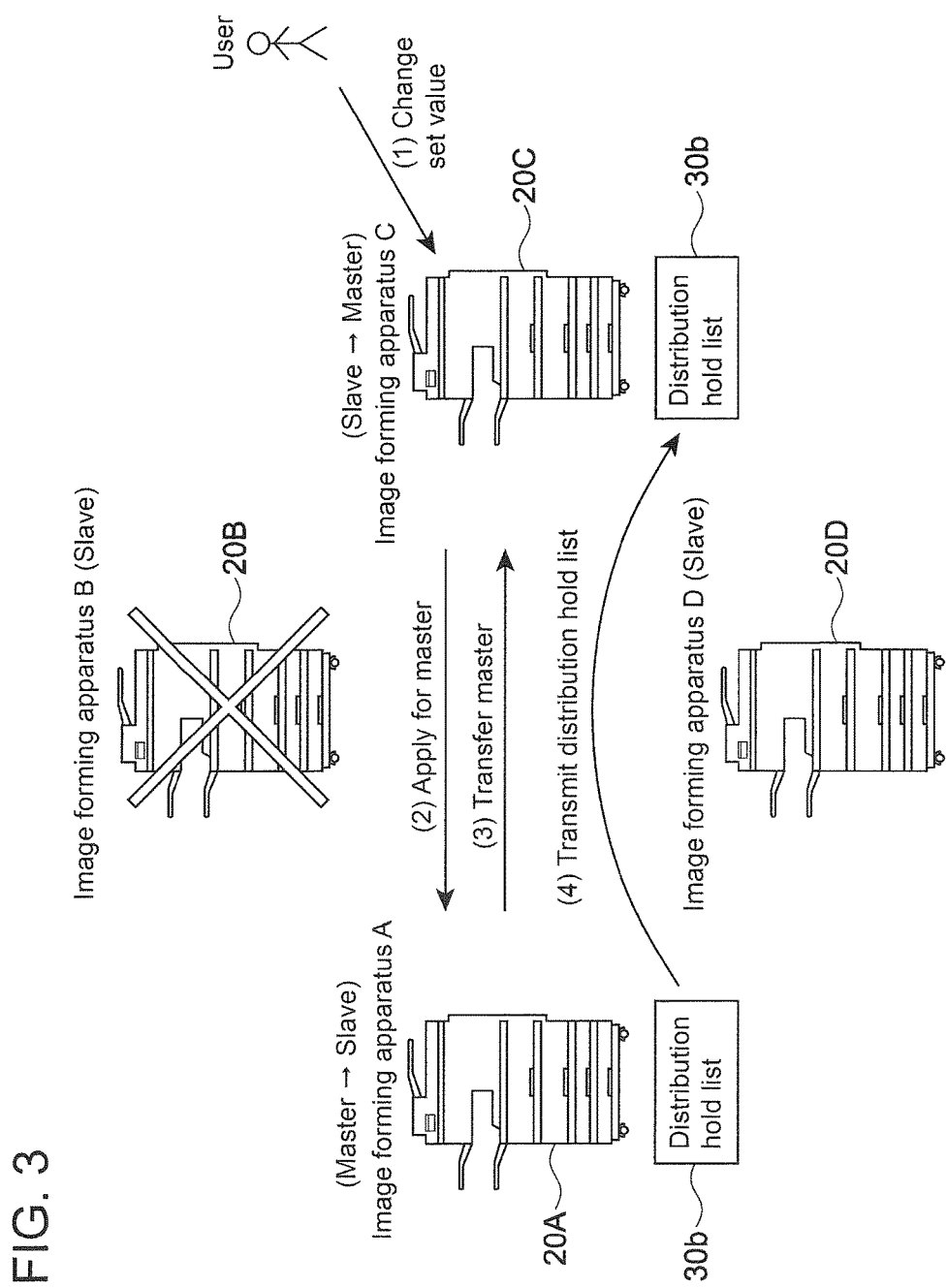
FIG. 3 illustrates an outline of transferring the distribution hold list when another image forming apparatus is a master.

First, the following describes an outline. FIGS. 1 to 3 illustrate the outline of the disclosure.

Creation or Update of Distribution Hold List

First, the following describes an outline of creating or updating a distribution hold list. FIG. 1 illustrates the outline of creating or updating the distribution hold list.

FIG. 1 exemplary illustrates four image forming apparatuses (20A, 20B, 20C, and 20D) according to the embodiment of the disclosure. These image forming apparatuses are communicative one another via a network.

As illustrated in FIG. 1, assume that the image forming apparatus 20A is a master, the image forming apparatus 20B is not in a ready state due to, for example, power supply off. The ready state is a state where the image forming apparatus normally operates.

In the following description, a master authority, that is, an image forming apparatus with an authority for distributing a changed set value to another image forming apparatus is referred to as a master. An image forming apparatus without the master authority is referred to as a slave.

(1) First, assume that a user goes to the image forming apparatus 20A to change a set value.

(2) Since the image forming apparatus 20A has the master authority, the image forming apparatus 20A starts distributing the set value changed by another image forming apparatus in a network based on an image forming apparatus list 30a (see FIG. 5) included in the image forming apparatus 20A itself.

In this example, assume that the distribution of the changed set value to the image forming apparatus 20B is attempted first.

(3) Since the image forming apparatus 20B is not in the ready state, the image forming apparatus 20B replies a fact of a reflection failure of the set value to the image forming apparatus 20A, which is the master (a reflection NG response), or does not reply.

(4) The image forming apparatus 20A, which is the master, detects the reflection failure of the set value in the image forming apparatus 20B and records the image forming apparatus 20B and a set content, which has not been distributed to the image forming apparatus 20B, in a distribution hold list 30b (described below).

(5) Next, the changed set value is distributed to the image forming apparatus 20C.

(6) Since the image forming apparatus 20C is in the ready state, the distributed set value is appropriately reflected, and the image forming apparatus 20C transmits a reflection completion response.

(7) Next, the changed set value is distributed to the image forming apparatus 20D.

(8) Since the image forming apparatus 20D is in the ready state, the distributed set value is appropriately reflected, and the image forming apparatus 20D transmits a reflection completion response.

The above is the outline of creating or updating the distribution hold list 30b.

Distribution Hold List

Here, the following describes a concrete example of the distribution hold list 30b. FIG. 2 illustrates the concrete example of the distribution hold list 30b.

The distribution hold list 30b stores a name (an identifier) of an image forming apparatus for which a distribution and a combination of a name of a setting item, which the distribution is held, and a set value are held.

In the example illustrated in FIG. 2, an entry ex1 indicates a held distribution for changing a value of a setting item X to "A4" with respect to the image forming apparatus 20B.

An entry ex2 similarly indicates a held distribution for changing a value of a setting item Y to "100" with respect to the image forming apparatus 20B.

Transfer of Distribution Hold List

Next, the following describes an outline of transferring the distribution hold list when another image forming apparatus becomes the master. FIG. 3 illustrates the outline of transferring the distribution hold list when another image forming apparatus becomes the master.

(1) First, assume that a user goes to the image forming apparatus 20C to change a set value.

(2) The image forming apparatus 20C, for which the set value has been changed, transmits a master request for transferring the master authority, to the image forming apparatus 20A, which is the present master, to distribute the changed set value to another image forming apparatus.

(3) The image forming apparatus 20A, which has received the master request, transfers the master authority to the image forming apparatus 20C.

(4) The image forming apparatus 20A itself has the distribution hold list 30b and additionally transmits the distribution hold list 30b to the image forming apparatus 20C. After the transmission, the image forming apparatus 20A switches itself to the slave from the master.

The above is the outline of transferring the distribution hold list when another image forming apparatus is the master.

Distribution to Slave that has Returned to Ready State

Figure 4:
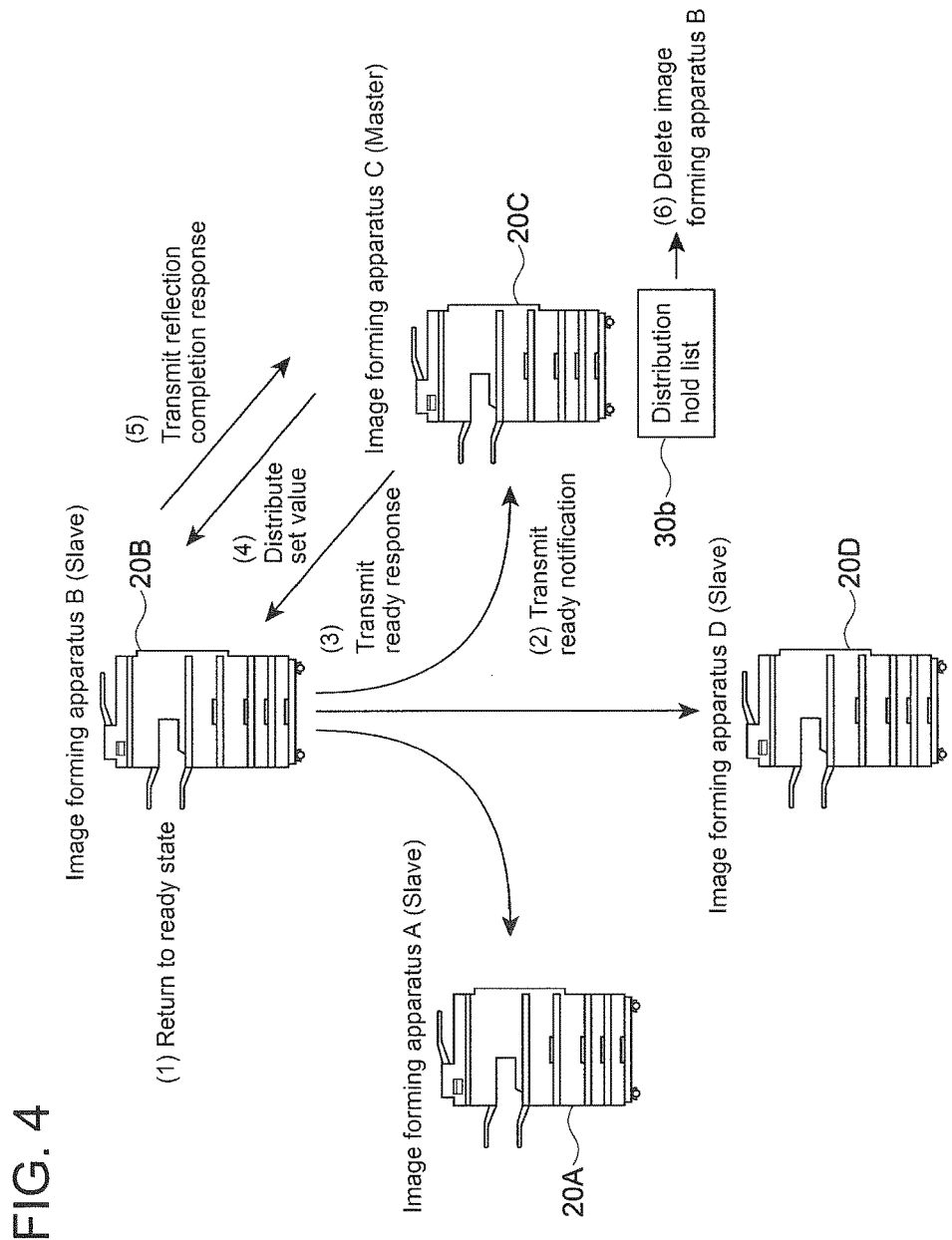
FIG. 4 illustrates an outline of distributing a held set value to an image forming apparatus that has returned to a ready state.

Next, the following describes an outline of distributing a held set value to an image forming apparatus that has returned to the ready state. FIG. 4 illustrates the outline of distributing the held set value to the image forming apparatus that has returned to the ready state.

(1) First, assume that the image forming apparatus 20B returns to the ready state.

(2) The image forming apparatus 20B, which has returned to the ready state, transmits a ready notification indicating a fact that the image forming apparatus 20B has returned to the ready state to notify the image forming apparatus 20C, which is the master, of the fact. The ready notification is a notification indicating a fact of a return to a normal state. The ready notification may be transmitted with broadcast or multicast, and may be transmitted to an image forming apparatus, which is individually specified as the master.

(3) The master, which has received the ready notification, transmits a ready response.

(4) The master refers to the distribution hold list 30b to distribute a set value, for which a distribution has been held, to the image forming apparatus 20B, which has returned to the ready state.

(5) The image forming apparatus 20B executes a reflection of the distributed set value and transmits a reflection completion response.

(6) The master, which has received the reflection completion response, deletes an entry regarding the image forming apparatus 20B from the distribution hold list 30b.

The above is the outline of distributing the held set value to the image forming apparatus that has returned to the ready state.

The above has described the outline.

Configuration

Figure 5:
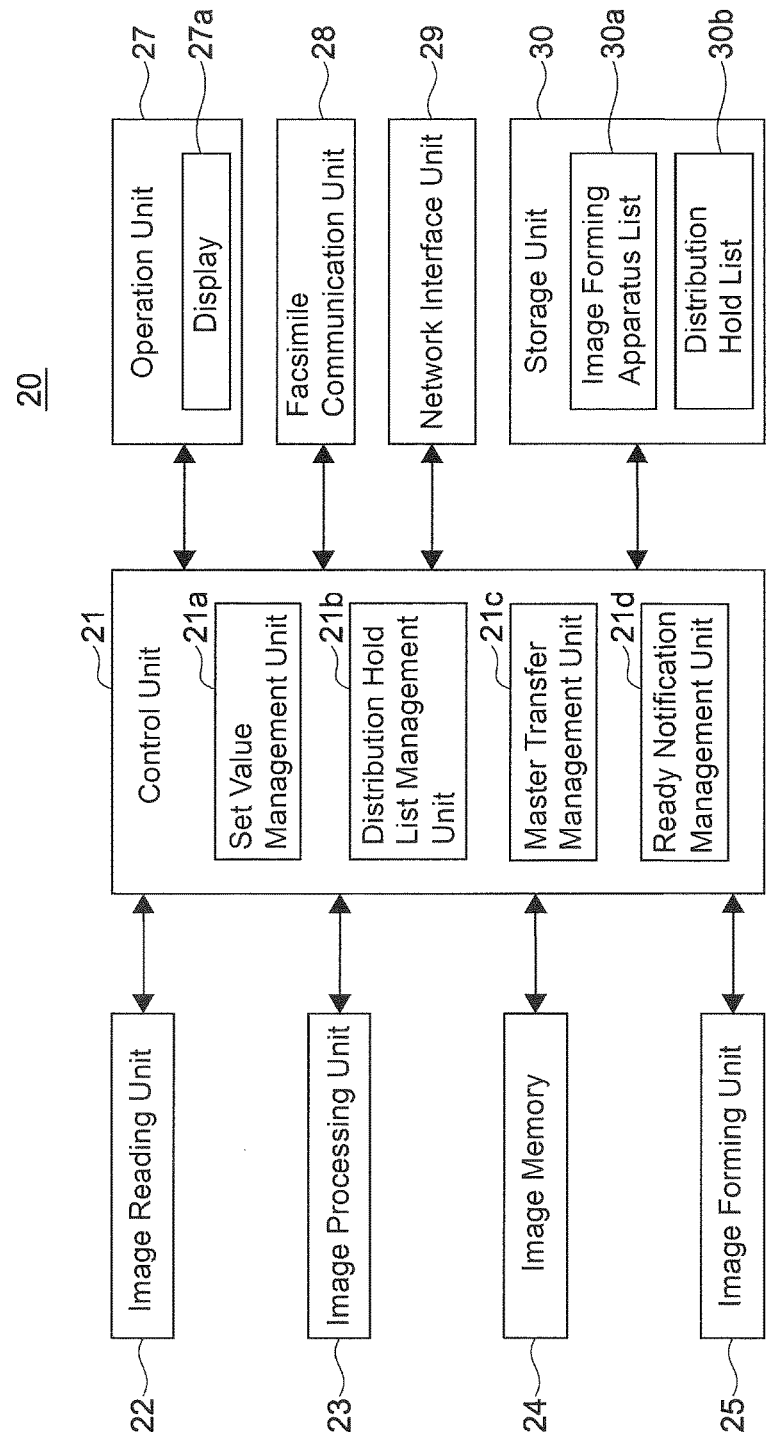
FIG. 5 illustrates a configuration of the image forming apparatus according to the embodiment of the disclosure.

Next, the following describes a configuration of an image forming apparatus according to the embodiment of the disclosure. FIG. 5 illustrates a configuration of an image forming apparatus 20 according to the embodiment of the disclosure.

The image forming apparatus 20 includes a control unit 21. The control unit 21 is constituted of a Central Processing Unit (CPU), a Random Access Memory (RAM), a Read Only Memory (ROM), a dedicated hardware circuit, and similar member, and manages an entire operation control of the image forming apparatus 20.

The control unit 21 is connected to an image reading unit 22, an image processing unit 23, an image memory 24, an image forming unit 25, an operation unit 27, a display 27a, a facsimile communication unit 28, a network interface unit 29, a storage unit 30, and similar unit. The control unit 21 executes an operation control of the connected respective units described above and transmits and receives a signal or data to/from the respective units. The network interface unit 29 is also referred to as a communication circuit. The storage unit 30 is also referred to as a storage circuit.

The control unit 21 controls a driving and processing of a mechanism required for execution of an operation control of respective functions such as a scanner function, a printing function, a copy function, and a facsimile transmission/reception function based on an execution instruction of a job input by a user, via, for example, the operation unit 27 or a network-connected PC.

The control unit 21 further includes a set value management unit 21a, a distribution hold list management unit 21b, a master transfer management unit 21c, and a ready notification management unit 21d. That is, when the CPU executes programs loaded in the RAM from, for example, the ROM as a non-transitory recording medium, the control unit 21 operates as the set value management unit 21a, the distribution hold list management unit 21b, the master transfer management unit 21c, and the ready notification management unit 21d. The set value management unit 21a is also referred to as a set value management circuit. The distribution hold list management unit 21b is also referred to as a distribution hold list management circuit. The master transfer management unit 21c is also referred to as a master transfer management circuit. The ready notification management unit 21d is also referred to as a ready notification management circuit.

The set value management unit 21a detects that one of the image forming apparatuses 20 has a set value changed by the user, and the set value management unit 21a distributes the changed set value to the other image forming apparatuses 20.

The distribution hold list management unit 21b controls the distribution hold list 30b.

The master transfer management unit 21c controls a transfer of a master authority.

The ready notification management unit 21d controls an exchange related to a ready notification between the master and the slave.

The image reading unit 22 reads an image from a document.

The image processing unit 23 executes image processing for image data of the image read by the image reading unit 22 as necessary. For example, the image processing unit 23 executes image processing, such as shading correction, to improve a quality of the image read by the image reading unit 22 after image formation.

The image memory 24 has a region where the image memory 24 temporarily stores data of a document image read by the image reading unit 22, and data as a print target to be printed by the image forming unit 25.

The image forming unit 25 executes image formation of the image data read by the image reading unit 22 or similar image data.

The operation unit 27 includes a touch panel unit and an operation key unit, which accept instruction of various operations and processing executable for the image forming apparatus 20 from a user. The touch panel unit includes the display 27a, such as a Liquid Crystal Display (LCD) including a touch panel.

The facsimile communication unit 28 includes an encoding/decoding unit, a modulation/demodulation unit, and a Network Control Unit (NCU), which are not illustrated, and executes facsimile transmission using a dial-up line network.

The network interface unit 29 is constituted of a communication circuit such as a LAN board. The network interface unit 29 transmits and receives various data to/from a device (for example, a PC) in a local area via a LAN or similar network connected to the network interface unit 29.

The storage unit 30, which is a large-capacity storage device such as a Hard Disk Drive (HDD), has an area for storing, for example, a document image read by the image reading unit 22. The storage unit 30 stores the image forming apparatus list 30a and the distribution hold list 30b.

The image forming apparatus list 30a is in a network, and is a list of the image forming apparatuses 20, which has become the master or the slave and shares a set value.

The distribution hold list 30b has been described above.

The above has described the configuration of the image forming apparatus 20.

Flow of Process 1

Figure 6:
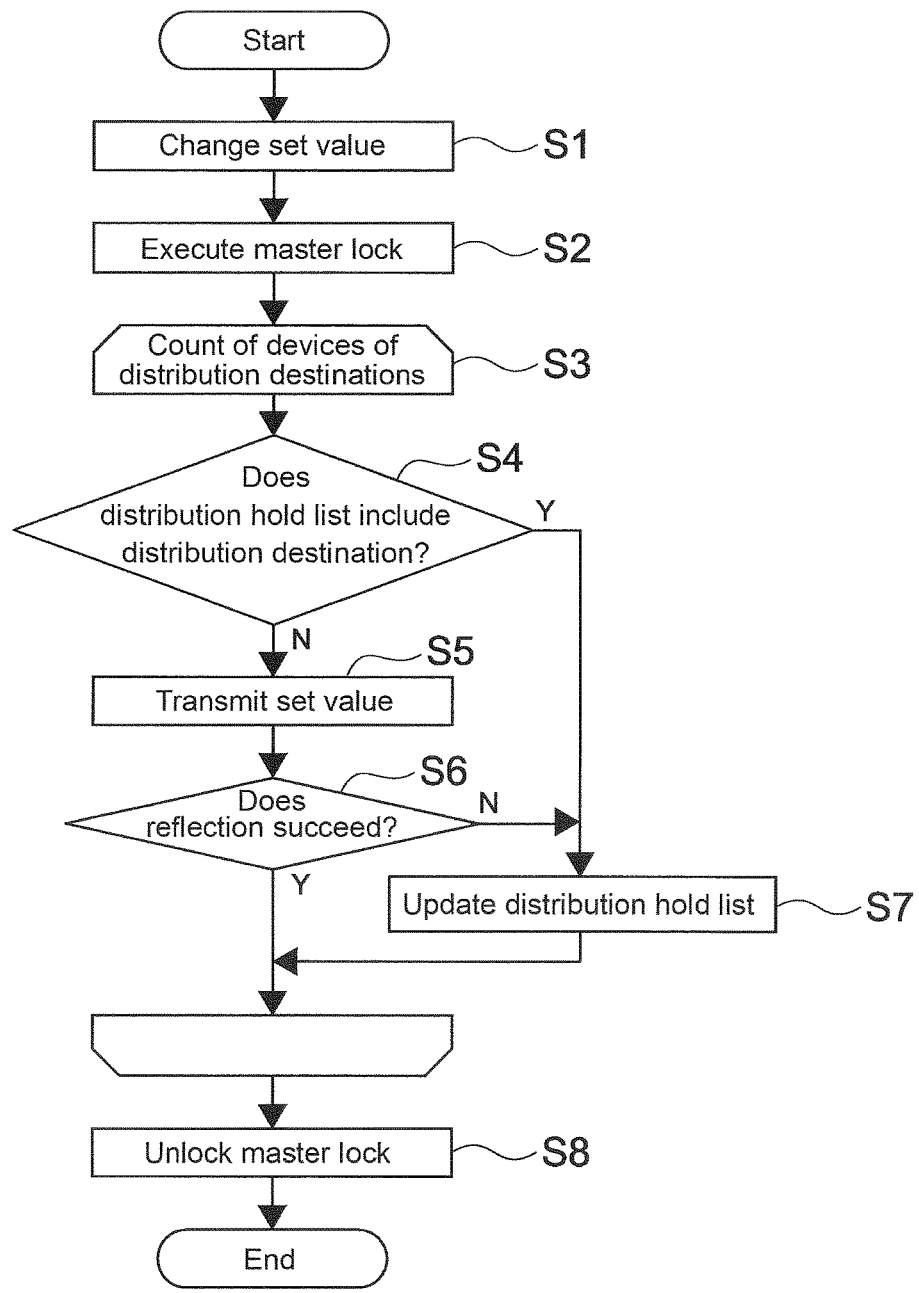
FIG. 6 illustrates a process of the master when a set value of the master is changed, and the master distributes the set value.

Next, the following describes a process of the master when a set value of the master is changed, and the master distributes the set value. FIG. 6 illustrates the process of the master when the set value of the master is changed, and the master distributes the set value.

First, assume that the user changes a set value of the image forming apparatus 20 as the master (Step S1).

Next, the set value management unit 21a executes a master lock (Step S2). With the master lock, the master request is rejected even if the slave transmits a master request during the master is locked. The master lock is executed while the master is distributing a set value.

Next, the set value management unit 21a repeats a process from Steps S4 to S7 for every slave to which the changed set value is distributed (Step S3).

The set value management unit 21a determines whether or not the distribution hold list 30b includes the slave as a distribution destination (Step S4).

When the distribution hold list 30b includes the slave (Y at Step S4), the set value management unit 21a avoids distributing to the slave, and the distribution hold list management unit 21b adds a combination of a name of the avoided image forming apparatus as the slave and the changed set value to the distribution hold list 30b and then updates the distribution hold list 30b (Step S7).

At the time, when the distribution hold list 30b has already included a combination including the identical content, the combination of the name of the avoided image forming and the changed set value is overwritten, and then the distribution hold list 30b is updated. After that, the set value management unit 21a proceeds to a process for the next slave.

As described later, the image forming apparatus 20 that has returned to the ready state is deleted from the distribution hold list 30b. The distribution hold list 30b still including the image forming apparatus 20 indicates that the image forming apparatus 20 has not been in the ready state yet.

When the distribution hold list 30b does not include the slave as the distribution destination (N at Step S4), the set value management unit 21a transmits the changed set value to the slave as a target (Step S5).

Next, based on a response from the slave, the set value management unit 21a determines whether or not a reflection of the transmitted set value succeeds (Step S6).

When the reflection succeeds (Y at Step S6), the set value management unit 21a proceeds a process for the next slave.

When the reflection fails (N at Step S6), the distribution hold list management unit 21b adds a combination of a name of the image forming apparatus 20, for which the reflection has failed, and the changed set value to the distribution hold list 30b, and then updates the distribution hold list 30b (Step S7). After that, the set value management unit 21a proceeds to a process for the next slave.

After the process for every slave is completed, the set value management unit 21a unlocks the master lock (Step S8).

The above has described the process of the master when the set value of the master is changed, and the master distributes the set value.

Flow of Process 2

Figure 7:
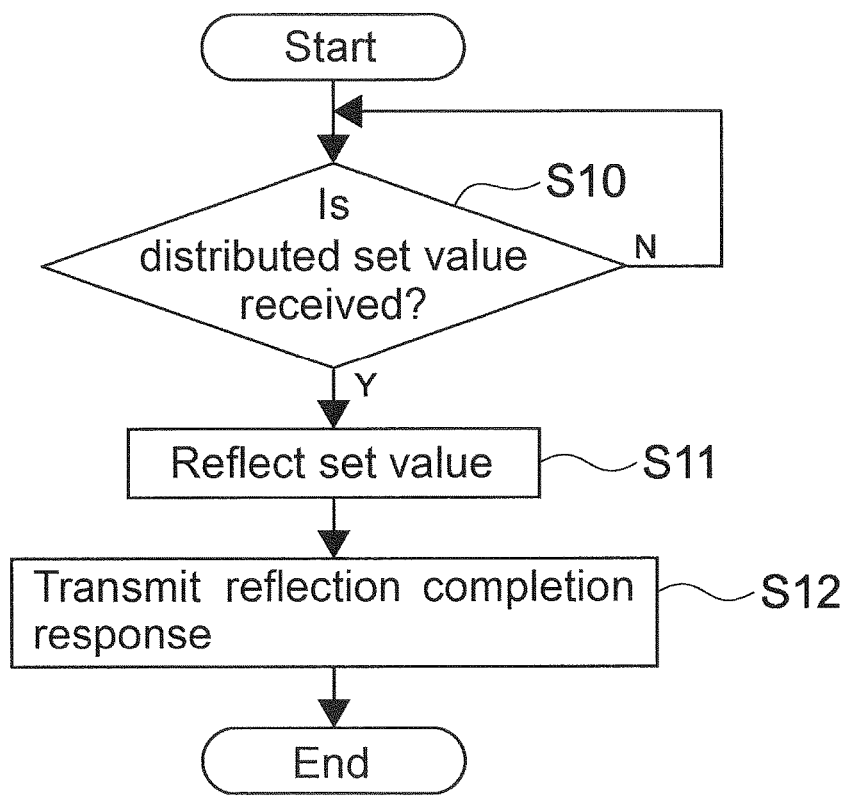
FIG. 7 illustrates a process of a slave when the master distributes the changed set value of the master.

Next, the following describes a process of the slave when the master distributes the changed set value of the master. FIG. 7 illustrates the process of the slave when the master distributes the changed set value of the master.

First, the set value management unit 21a determines whether or not the slave receives the set value transmitted from the master (Step S10).

When the set value is not received (N at Step S10), the set value management unit 21a returns to Step S10 and then waits.

When the set value is received (Y at Step S10), the set value management unit 21a reflects the received set value in a setting item as a target (Step S11).

Next, the set value management unit 21a returns a reflection completion response to the master (Step S12).

The above has described the process of the slave when the master distributes the changed set value of the master.

Flow of Process 3

Figure 8:
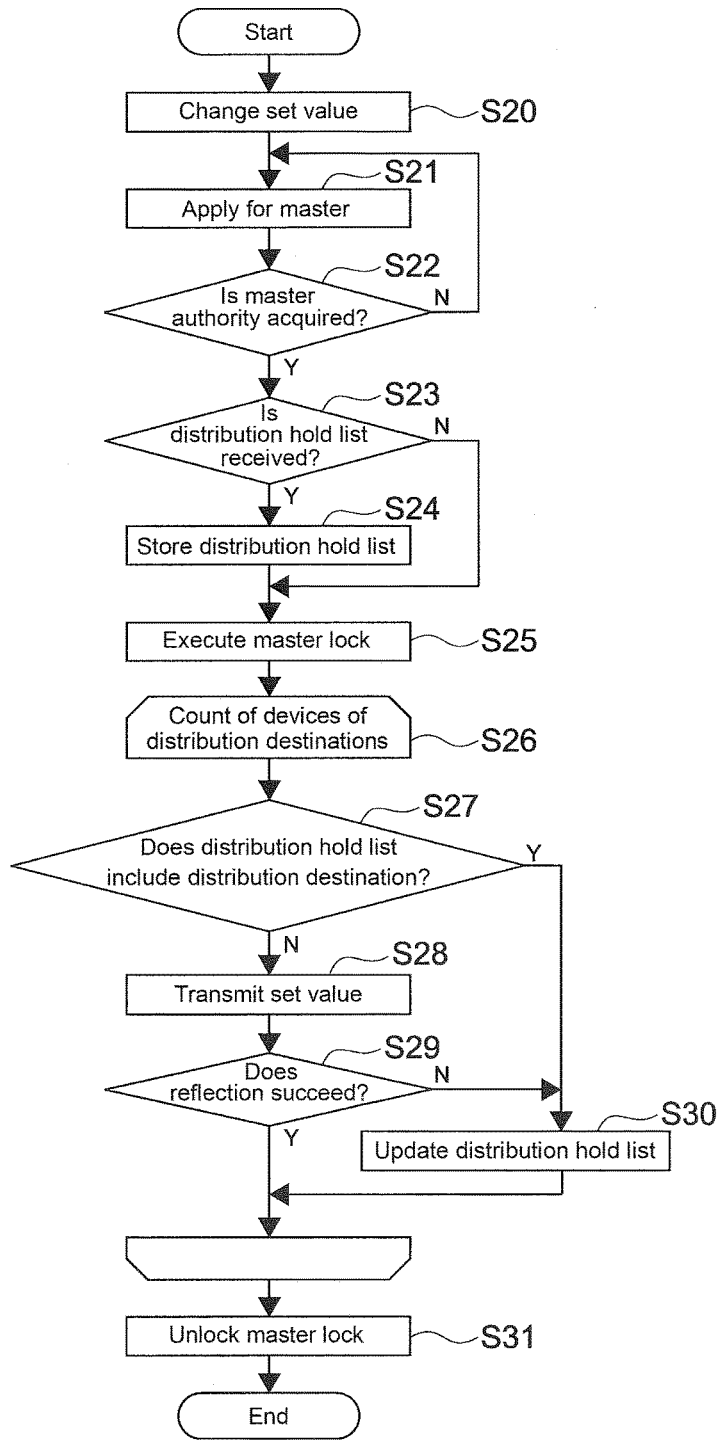
FIG. 8 illustrates a process of the image forming apparatus that distributes a changed set value, which is changed when the image forming apparatus is the slave, after the image forming apparatus has become the master.

Next, the following describes a process of the image forming apparatus where a set value is changed when the image forming apparatus is the slave, and the image forming apparatus distributes the changed set value after the image forming apparatus has become the master. FIG. 8 illustrates the process of the image forming apparatus where a set value is changed when the image forming apparatus is the slave, and the image forming apparatus distributes the changed set value after the image forming apparatus has become the master.

First, assume that the user changes a set value of the image forming apparatus 20 as the slave (Step S20).

Next, the master transfer management unit 21c transmits a master request to the master (Step S21). The master request is a message that requests the master to transfer the master authority.

Next, the master transfer management unit 21c determines whether or not the master authority is acquired (Step S22).

When the master authority is not acquired (N at Step S22), the master transfer management unit 21c returns to Step S21 and transmits the master request again.

When the master authority is acquired (Y at Step S22), the distribution hold list management unit 21b determines whether or not the distribution hold list 30b is received from the master (Step S23).

When the distribution hold list 30b is received (Y at Step S23), the distribution hold list management unit 21b stores the received distribution hold list 30b in the storage unit 30 (Step S24).

Next, the set value management unit 21a executes a master lock (Step S25).

Next, the set value management unit 21a repeats a process from Steps S27 to S30 for every slave to which the changed set value is distributed (Step S26).

The set value management unit 21a determines whether or not the distribution hold list 30b includes the slave as a distribution destination (Step S27).

When the distribution hold list 30b includes the distribution destination (Y at Step S27), the set value management unit 21a avoids distributing to the slave, and the distribution hold list management unit 21b adds a combination of a name of the avoided image forming apparatus as the slave and the changed set value to the distribution hold list 30b, and then updates the distribution hold list 30b (Step S30).

At this time, when the distribution hold list 30b has already included a combination including the identical content, the combination of the name of the avoided image forming apparatus and the changed set value is overwritten, and then the distribution hold list 30b is updated. After that, the set value management unit 21a proceeds to a process for the next slave.

When the distribution hold list 30b does not include the slave as the distribution destination (N at Step S27), the set value management unit 21a transmits the changed set value to the slave as a target (Step S28).

Next, based on a response from the slave, the set value management unit 21a determines whether or not a reflection of the transmitted set value succeeds (Step S29).

When the reflection succeeds (Y at Step S29), the set value management unit 21a proceeds to a process for the next slave.

When the reflection fails (N at Step S29), the distribution hold list management unit 21b adds a combination of a name of the image forming apparatus 20, for which the reflection has failed, and the changed set value to the distribution hold list 30b, and then updates the distribution hold list 30b (Step S30). After that, the set value management unit 21a proceeds to a process for the next slave.

After the processes for all the slaves are completed, the set value management unit 21a unlocks the master lock (Step S31).

The above has described the process of the image forming apparatus where that a set value is changed when the image forming apparatus is the slave, and the image forming apparatus distributes the changed set value after the image forming apparatus has become the master.

Flow of Process 4

Next, the following describes a process of the image forming apparatus 20 that transitions from the master to the slave due to a change of a set value and a master request by a slave. FIG. 9 illustrates the process of the image forming apparatus 20 that transitions from the master to the slave due to the change of the set value and the master request.

First, the master transfer management unit 21c determines whether or not the master request is accepted from the slave that has received the change of the set value (Step S40).

When the master request is not accepted (N at Step S40), the master transfer management unit 21c returns to Step S40 and then waits.

When the master request is accepted (Y at Step S40), the master transfer management unit 21c determines whether or not the own device is in a master lock state (Step S41).

When the device is in the master lock state (Y at Step S41), the master transfer management unit 21c replies a rejection notification of the master authority transfer to the slave, which has transmitted the master request, and then terminates the process (Step S42).

When the device is not in the master lock state (N at Step S41), the master transfer management unit 21c transfers the master authority to the slave, which has transmitted the master request (Step S43).

Next, the master transfer management unit 21c determines whether or not the distribution hold list 30b, which is stored in the storage unit 30, includes the image forming apparatus 20 for which a distribution is held (Step S44).

When the distribution hold list 30b includes the image forming apparatus 20 for which the distribution is held (Y at Step S44), the master transfer management unit 21c transmits the distribution hold list 30b to the slave, which has transmitted the master request (Step S45).

Next, the master transfer management unit 21c changes the own device into a slave setting (Step S46).

The above has described the process of the image forming apparatus 20 that transitions from the master to the slave due to the change of the set value and the master request.

Flow of Process 5

Next, the following describes a process of the slave to which the image forming apparatus 20, which has become the master due to the change of the set value, distributes the set value. FIG. 10 illustrates the process of the slave to which the image forming apparatus 20, which has become the master due to the change of the set value, distributes the set value.

First, the set value management unit 21a determines whether or not the set value transmitted from the master is received (Step S10).

When the set value is not received (N at Step S10), the set value management unit 21a returns to Step S10 and then waits.

When the set value is received (Y at Step S10), the set value management unit 21a reflects the received set value in a setting item as a target (Step S11).

Next, the set value management unit 21a transmits a reflection completion response to the master (Step S12).

The above has described the process of the slave to which the image forming apparatus 20, which has become the master due to the change of the set value, distributes the set value.

Flow of Process 6

Next, the following describes a process of the slave, which has returned to the ready state, receives the set value for which a distribution is held. FIG. 11 illustrates the process of the slave, which has returned to the ready state, receives the set value for which the distribution is held.

First, assume that the image forming apparatus 20 as the slave returns to the ready state (Step S50).

Next, the ready notification management unit 21d in the image forming apparatus 20, which has returned to the ready state, detects that the own device returns to the ready state, and then transmits a ready notification to the master in the network using the above-described method (Step S51).

Next, the ready notification management unit 21d determines whether or not a ready response is received from the master (Step S52).

When the ready response is not received (N at Step S52), the ready notification management unit 21d transmits a ready renotification using the above-described method (Step S53).

When the ready response is received (Y at Step S52), next, the set value management unit 21a determines whether or not the set value is received from the master (Step S54).

When the set value is not received (N at Step S54), the process terminates because the master does not include a held set value regarding the slave.

When the set value is received (Y at Step S54), the set value management unit 21a reflects the received set value in the own device (Step S55).

Next, the set value management unit 21a transmits a reflection completion response to the master (Step S56).

The above has described the process where the slave, which has returned to the ready state, receives the set value for which the distribution is held.

Flow of Process 7

Next, the following describes a process where the master distributes the set value, for which the distribution is held, to the slave, which has returned to the ready state. FIG. 12 illustrates the process where the master distributes the set value, for which the distribution is held, to the slave, which has returned to the ready state.

First, the ready notification management unit 21d as the master determines whether or not a ready notification is received from the slave, which has returned to the ready state, (Step S60).

When the ready notification is not received (N at Step S60), the ready notification management unit 21d returns to Step S60 and then waits.

When the ready notification is received (Y at Step S60), the ready notification management unit 21d transmits a ready response to the slave, which has transmitted the ready notification (Step S61).

Next, the set value management unit 21a determines whether or not the distribution hold list 30b includes the image forming apparatus 20, which has transmitted the ready notification (Step S62).

When the distribution hold list 30b does not include the image forming apparatus 20 (N at Step S62), the process terminates because the distribution hold list 30b does not include a set value to be distributed to the image forming apparatus 20, which has transmitted the ready notification.

When the distribution hold list 30b includes the image forming apparatus 20 (Y at Step S62), the set value management unit 21a executes a master lock (Step S63). Next, the set value management unit 21a transmits the held set value (Step S64).

Next, the set value management unit 21a determines whether or not a reflection of the set value succeeds based on a response from the slave (Step S65).

When the reflection of the set value succeeds (Y at Step S65), the set value management unit 21a deletes an entry regarding the image forming apparatus 20, which has transmitted the ready notification, from the distribution hold list 30b (Step S66).

When the reflection of the set value fails (N at Step S65), the set value management unit 21a retains the entry regarding the image forming apparatus 20, which has transmitted the ready notification, in the distribution hold list 30b (no action).

Next, the set value management unit 21a unlocks the master lock (Step S67). With the embodiment, the image forming apparatus of the disclosure ensures execution of asynchronous information sharing among image forming apparatuses without using a mail server even when a part of the image forming apparatuses is turned off.

The above has described the process where the master distributes the set value, for which the distribution is held, to the slave, which has returned to the ready state.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming apparatus that shares information with a plurality of other image forming apparatuses, the image forming apparatus comprising:
   a communication circuit that ensures communication with the plurality of other image forming apparatuses;
   a set value management circuit that distributes, when a set value of the image forming apparatus is changed and the image forming apparatus has a master authority as an authority for distributing the changed set value to a plurality of slave image forming apparatuses of the plurality of other image forming apparatuses, the changed set value to the plurality of slave image forming apparatuses of not having the master authority;
   a storage circuit that, when the distribution to a first one of the slave image forming apparatuses fails, stores a distribution hold list including a combination of: an identifier of the first slave image forming apparatus where the distribution has failed, and an item name and value of the changed set value where the distribution has failed; and
   a distribution hold list management circuit that manages the stored distribution hold list.

2. The image forming apparatus according to claim 1, further comprising
   a master transfer management circuit that, when the master transfer management circuit receives a master request for acquiring the master authority from a second one of the slave image forming apparatuses as one image forming apparatus among the plurality of slave image forming apparatuses in a state where a set value of the second slave image forming apparatus has been changed and the image forming apparatus has the master authority, transfers the master authority to the second slave image forming apparatus,
   wherein when the master transfer management circuit transfers the master authority to the second slave image forming apparatus, the master transfer management circuit transmits the distribution hold list to the second slave image forming apparatus, and
   wherein the image forming apparatus is a third one of the slave image forming apparatuses after transferring the master authority.

3. The image forming apparatus according to claim 2,
   wherein when the set value of the image forming apparatus is changed and the image forming apparatus has the master authority, the set value management circuit executes a master lock for refusing the master request until distribution processes for all of the plurality of slave image forming apparatuses is completed.

4. The image forming apparatus according to claim 2,
   wherein when the set value of the image forming apparatus is changed and the image forming apparatus does not have the master authority, the master transfer management circuit transmits the master request to a master image forming apparatus of the plurality of the other image forming apparatuses, the master image forming apparatus having the master authority, and
   wherein when the master authority is acquired, the set value management circuit distributes the changed set value before acquiring the master authority, to the plurality of slave image forming apparatuses.

5. The image forming apparatus according to claim 1, further comprising
   a ready notification management circuit that ensures reception of a ready notification indicating a fact that the first slave image forming apparatus where the distribution has failed returns to a normal state, from the other image forming apparatus where the distribution has failed,
   wherein when the set value management circuit receives the ready notification and the image forming apparatus has the master authority, the set value management circuit determines whether or not the distribution hold list includes the first image forming apparatus that has transmitted the ready notification and
   when the distribution hold list includes the first slave image forming apparatus that has transmitted the ready notification, the set value management circuit transmits the changed set value where the distribution has been held to the first slave image forming apparatus that has transmitted the ready notification.

6. The image forming apparatus according to claim 5,
   wherein when the set value management circuit receives the ready notification and the image forming apparatus has the master authority, the set value management circuit executes a master lock for refusing the master request until a distribution process for the first slave image forming apparatus is completed.

7. The image forming apparatus according to claim 5,
   wherein when the distribution to the first slave image forming apparatus succeeds after the set value management circuit receives the ready notification, deletes the combination including the identifier of the first slave image forming apparatus from the distribution hold list.

8. A non-transitory computer-readable recording medium storing an information processing program to control an image forming apparatus, the image forming apparatus that shares information with a plurality of other image forming apparatuses, the information processing program causing a computer of the image forming apparatus to operate as:
   a communication circuit that ensures communication with the plurality of other image forming apparatuses;
   a set value management circuit that distributes, when changing a set value of the image forming apparatus is changed and the image forming apparatus has a master authority as an authority for distributing the changed set value to a plurality of slave image forming apparatuses of the plurality of other image forming apparatuses, the changed set value to the plurality of slave image forming apparatuses;
   a storage circuit that, when the distribution to a first one of the slave image forming apparatuses fails, stores a distribution hold list including a combination of: an identifier of the first slave image forming apparatus where the distribution has failed, and an item name and value of the changed set value where the distribution has failed; and
   a distribution hold list management circuit that manages the stored distribution hold list.

* * * * *